United States Patent
Ebara et al.

(10) Patent No.: US 7,680,344 B2
(45) Date of Patent: Mar. 16, 2010

(54) ENCODING CONTROL CIRCUIT AND ENCODING CIRCUIT

(75) Inventors: Masami Ebara, Kobe (JP); Osamu Takae, Nara (JP)

(73) Assignee: Sanyo Electric Co., Ltd., Osaka (JP)

( * ) Notice: Subject to any disclaimer, the term of this patent is extended or adjusted under 35 U.S.C. 154(b) by 1165 days.

(21) Appl. No.: 11/112,712

(22) Filed: Apr. 22, 2005

(65) Prior Publication Data

US 2005/0249424 A1    Nov. 10, 2005

(30) Foreign Application Priority Data

Apr. 22, 2004 (JP) ............................... 2004-127146
Nov. 5, 2004 (JP) ............................... 2004-322296

(51) Int. Cl.
*G06K 9/36* (2006.01)

(52) U.S. Cl. ................. 382/232; 348/390.1; 348/392.1; 348/398.1; 348/405.1; 348/424.1

(58) Field of Classification Search .................. 382/232
See application file for complete search history.

(56) References Cited

U.S. PATENT DOCUMENTS

| | | | | |
|---|---|---|---|---|
| 4,047,221 A * | 9/1977 | Yasuda et al. | .......... | 375/240.05 |
| 4,816,914 A * | 3/1989 | Ericsson | ................ | 375/240.03 |
| 5,007,048 A * | 4/1991 | Kowalk | ....................... | 370/235 |
| 5,253,059 A * | 10/1993 | Ansari et al. | ............. | 348/390.1 |
| 5,365,274 A * | 11/1994 | Seki et al. | ................... | 348/458 |
| 5,440,345 A * | 8/1995 | Shimoda | ................ | 375/240.14 |
| 5,565,921 A * | 10/1996 | Sasaki et al. | ........... | 375/240.13 |
| 5,608,458 A * | 3/1997 | Chen et al. | ............. | 375/240.14 |
| 5,638,125 A * | 6/1997 | Jeong et al. | ............. | 375/240.03 |
| 5,650,829 A * | 7/1997 | Sugimoto et al. | .......... | 348/699 |
| 5,819,215 A * | 10/1998 | Dobson et al. | .............. | 704/230 |
| 5,963,674 A * | 10/1999 | Takeuchi et al. | ............ | 382/239 |
| 5,970,172 A | 10/1999 | Mochizuki | | |
| 6,026,190 A * | 2/2000 | Astle | .......................... | 382/232 |
| 6,188,792 B1 * | 2/2001 | Chujoh et al. | ............... | 382/236 |
| 6,243,497 B1 * | 6/2001 | Chiang et al. | ............... | 382/251 |
| 6,263,020 B1 * | 7/2001 | Gardos et al. | .......... | 375/240.03 |
| 6,292,654 B1 * | 9/2001 | Hessel et al. | ................. | 455/223 |
| 6,449,255 B1 * | 9/2002 | Waclawsky | ................. | 370/236 |
| 6,937,770 B1 * | 8/2005 | Oguz et al. | .................. | 382/235 |
| 2003/0083870 A1 * | 5/2003 | Lee et al. | ..................... | 704/229 |

(Continued)

FOREIGN PATENT DOCUMENTS

JP    6-217284    8/1994

(Continued)

OTHER PUBLICATIONS

English Patent Abstract of JP1029970 from esp@cenet.

(Continued)

*Primary Examiner*—Sath V Perungavoor
(74) *Attorney, Agent, or Firm*—Osha • Liang LLP

(57) ABSTRACT

It is possible to control the number of generated codes while retraining deterioration of an image quality by an encoding circuit constituted so as to select any of a first image signal not decreasing information quantity and a second image signal decreasing information quantity in accordance with the accumulated value of the number of codes.

2 Claims, 3 Drawing Sheets

U.S. PATENT DOCUMENTS

| | | |
|---|---|---|
| 2003/0086623 A1* | 5/2003 | Berkner et al. ............... 382/260 |
| 2004/0174278 A1* | 9/2004 | Kadono et al. ................ 341/67 |
| 2005/0053136 A1* | 3/2005 | Yu et al. ................ 375/240.16 |
| 2005/0175099 A1* | 8/2005 | Sarkijarvi et al. ...... 375/240.16 |
| 2005/0185854 A1* | 8/2005 | Kadono et al. .............. 382/246 |
| 2005/0238332 A1* | 10/2005 | Tsujii et al. ................. 386/111 |

FOREIGN PATENT DOCUMENTS

| | | |
|---|---|---|
| JP | 2574312 | 10/1996 |
| JP | 2827997 | 9/1998 |
| JP | 11-234668 A | 8/1999 |
| JP | 2002-223439 A | 8/2002 |

OTHER PUBLICATIONS

English Patent Abstract of JP9187004 from esp@cenet.
English Patent Abstract of JP6217284 from esp@cenet.
Patent Abstracts of Japan, Publication No. 06-217284, Publication Date Aug. 5, 1994, 2 pages.
Japanese Office Action for Application No. 2004-322296, mailed on Aug. 11, 2009 (4 pages).
English abstract for Japanese Publication No. 2002-223439, publication date Aug. 9, 2002, esp@cenet database, (1 page).
English abstract for Japanese Publication No. 11-234668, publication date Aug. 27, 1999, esp@cenet database, (1 page).

* cited by examiner

ENCODING CONTROL CIRCUIT AND ENCODING CIRCUIT

CROSS-REFERENCE TO RELATED APPLICATIONS

The entire disclosures of Japanese Patent Application Nos. 2004-127146 and 2004-322296 including their specifications, claims, drawings, and abstracts are incorporated herein by reference.

BACKGROUND OF THE INVENTION

1. Field of the Invention

The present invention relates to an encoding control circuit for controlling the number of generated codes in an image encoding circuit, and to an encoding circuit using the encoding control circuit.

2. Description of the Prior Art

Electronic devices very commonly employ a processing which converts analog image signals into digital signals by sampling the image signals and quantizing the sampling values. Moreover, the encoding processing such as compression processing for orthogonally transforming the sampling values is also performed. For example, the Hadamard transform corresponds to the above encoding processing.

Control of the number of generated codes is realized by applying division to each orthogonally-transformed component. The component of n-degree orthogonal transformation is shown as $H=S(n)$ (n is 0 to n−1).

Encoding control is realized by diving a component H by a value Q (quantization step). For example, when H is a value shown by 10 bits, H can be shown by 7 bits when dividing H by Q=8 and it is possible to decrease the number of generated codes by a value equivalent to 7 bits.

However, when increasing the value of Q in this encoding control, it is impossible to restore an image to an original image after reverse orthogonal transformation because the quantization step becomes large and the quantity of information is reduced as a result of encoding. For example, in the case of MPEG encoding, the image quality may be greatly deteriorated due to block noise.

SUMMARY OF THE INVENTION

The present invention solves the above-described problem by providing an encoding control circuit for controlling the number of codes generated in an image encoding circuit, which selects and outputs any of a first image signal not deteriorating a frequency bandwidth and a second image signal deteriorating the frequency bandwidth in accordance with an accumulated value for the number of codes in the image encoding circuit.

Moreover, an encoding control circuit of the present invention may be an encoding control circuit for controlling the number of codes generated in an image encoding circuit, comprising: a comparison-determination circuit for comparing an accumulated value of an actual number of codes of a constant time interval in an encoding unit period in the image encoding circuit with a preset reference number of codes corresponding to the time interval; a switch for selecting any of a first image signal not deteriorating a frequency bandwidth and a second image signal deteriorating the frequency bandwidth and inputting it to the image encoding circuit; and switch control means for making the switch select the first image signal when the accumulated value codes does not exceed the reference number and causing the switch to select the second image signal when the accumulated value exceeds the reference number.

Moreover, the present invention also provides an encoding circuit for encoding and outputting an image signal, comprising: an information-quantity decreasing portion for generating a second image signal by decreasing the information quantity of a first image signal and outputting the second image signal; a selecting portion for selecting any of the first image signal and the second image signal in accordance with a selection signal; an encoder for encoding the image signal output from the selecting circuit; a number-of-generated-codes accumulating and calculating portion for accumulating the number of codes of encoded image signals output from the encoder in a predetermined encoding unit period; and a comparator for comparing the actual values with a reference value predetermined for each the time interval and outputting the selection signal.

DESCRIPTION OF THE PREFERRED EMBODIMENT

Figure 1:
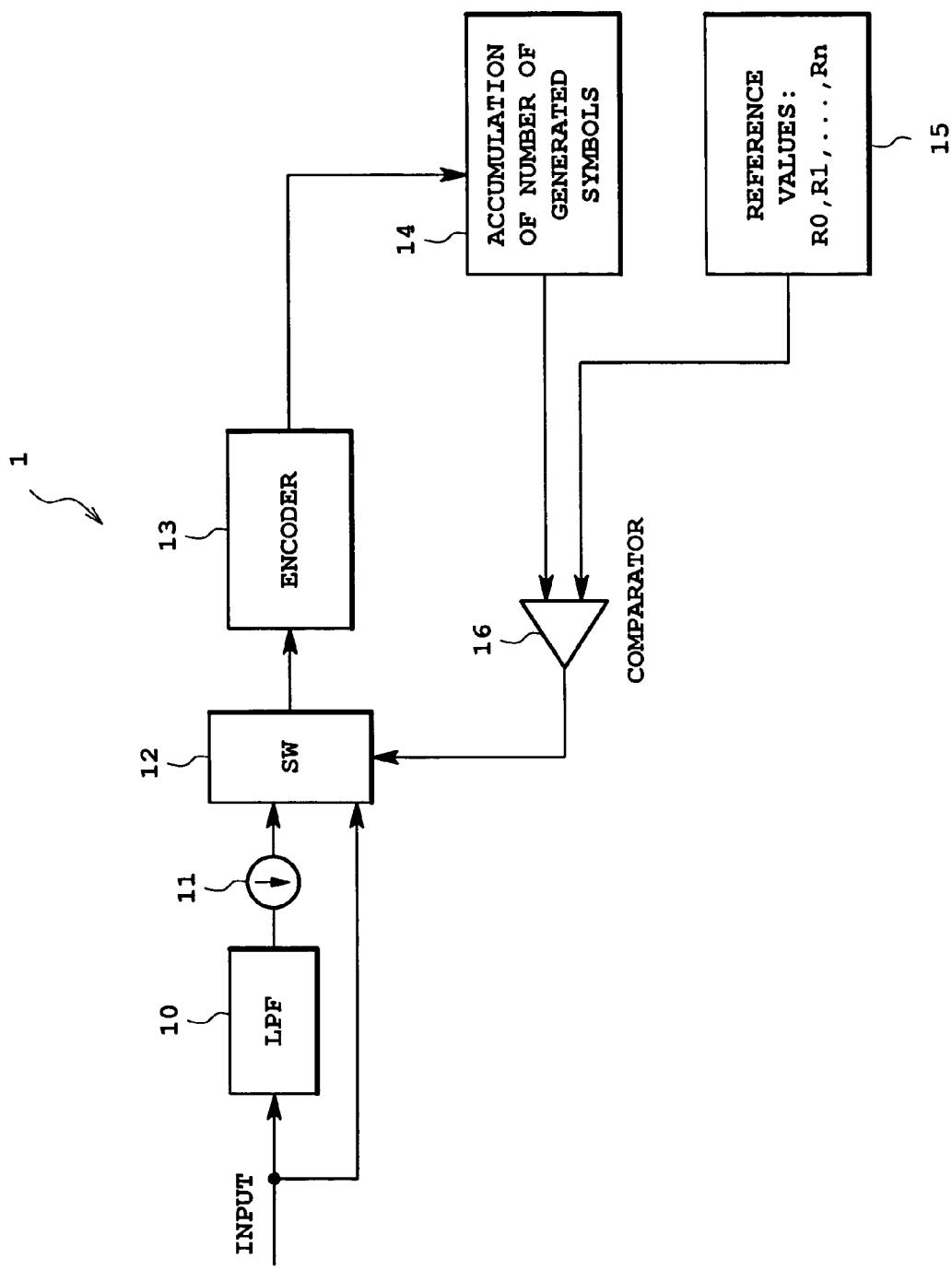
FIG. 1 is a block diagram showing an encoding circuit of an embodiment of the present invention.

FIG. 1 is a block diagram showing an encoding circuit 1. An input image signal is a digitized image signal (luminance/color-difference signal or RGB signal). An image signal passing through a low-pass filter (LPF) 10, which is a digital filter, and a sampling-rate decreasing portion 11 is input to the first input terminal of a switch 12 and an image signal is directly input to the second input terminal of the switch 12. The switch 12 selects an image signal in accordance with a comparison result by a comparator 16 to be described later. The low-pass filter 10 passes only the low frequency band of an input signal. For example, in the present embodiment, the frequency band of an image signal is narrowed to half. Moreover, the sampling-rate decreasing portion 11 outputs only every other value output from the low-pass filter 10. That is, the portion 11 discards every other output value, thereby for decreasing the sampling rate by one half.

Figure 3:
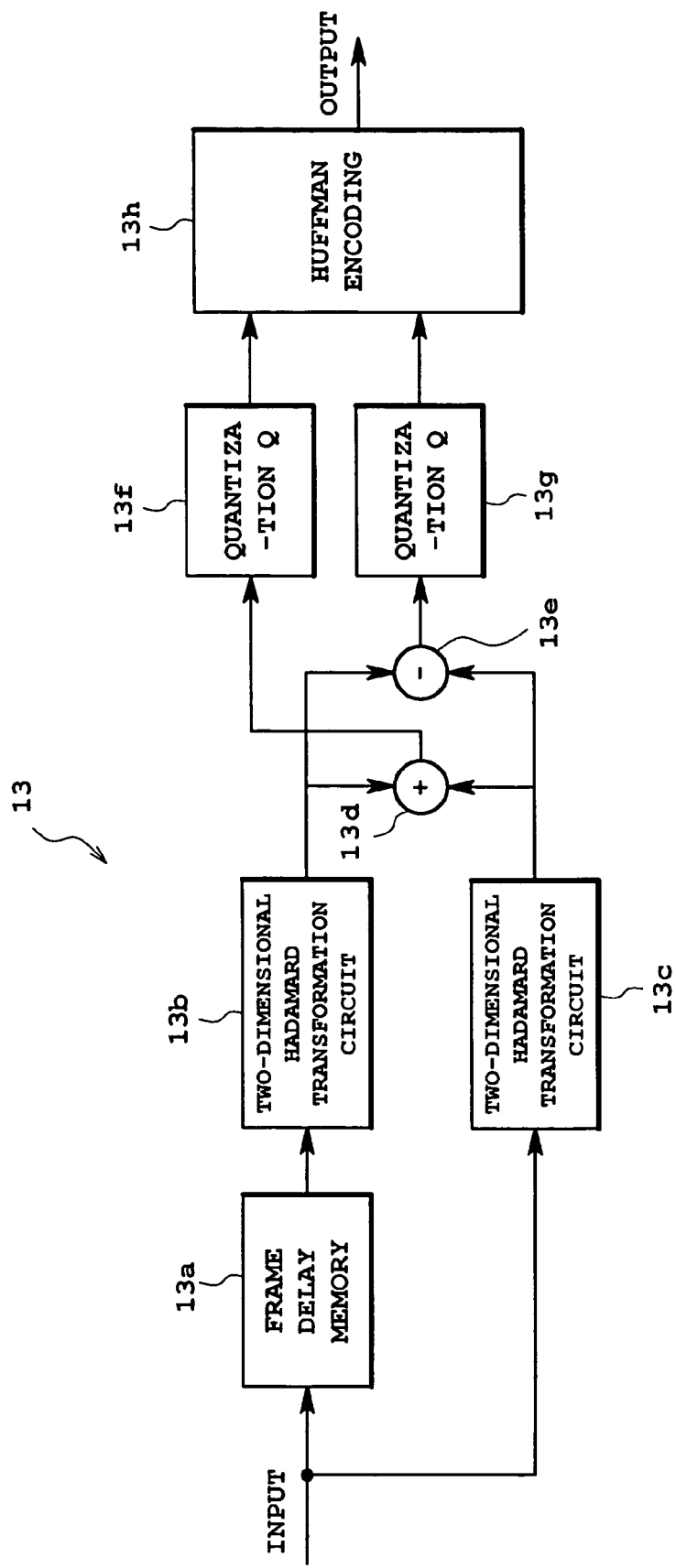
FIG. 3 is a block diagram showing an example encoder.

An image signal selected by the switch 12 is input to the encoder 13. The encoding method employed by the encoder 13 is not restricted by the present invention. Known encoding methods include orthogonal transforming methods such as DCT (discrete cosine transformation) and Hadamard transformation. In the present example, the encoder 13 is described by assuming that the encoder 13 performs the Hadamard transformation. The encoder 13 for performing the Hadamard transformation is shown in FIG. 3 as an example.

An image signal delayed by a frame delay memory 13a is input to a first Hadamard transformation circuit 13b of the encoder 13. Moreover, an image signal is directly input to a second Hadamard transformation circuit 13c. The Hadamard transformation circuits 13b and 13c respectively apply two-dimensional Hadamard transformation to the image signals and output the signals to an adder 13d and a subtracter 13e. The number of components of the two-dimensional Hadamard transformation becomes m×n in the case of a block of rows (m) and columns (n). For example, in the case of m=2 and n=2, four components are output.

The adder 13d and subtracter 13e add and subtract components of the two-dimensional Hadamard transformation from the first Hadamard transformation circuit 13b and the second Hadamard transformation circuit 13c. In this case, when the components for a signal having no frame delay are S(0) to S(m×n−1) and components for a signal having a frame delay are FS(0) to FS(m×n−1), the adder 13d and subtracter 13e at the next stage execute the following operations:

Adder=S(k)+FS(k)

Subtracter=S(k)−FS(k)

Quantizing portions 13f and 13g respectively apply quantization processing to each computation result. Both quantization results are connected in one-dimensional arrangement and input to a Huffman encoding circuit 13h. The Huffman encoder 13h performs widely-known Huffman encoding. For example, a not-illustrated transmitting portion is set to the rear stage of the Huffman encoder 13h. When the encoder 13 is set to, for example, a TV receiver, a received program can be transmitted from the transmitting portion. A child TV set which is an accessory of the TV receiver displays an image by receiving a transmission signal from the transmitting portion, performing demodulation processing, and moreover performing decoding processing.

In the case of the encoder 13, the encoding unit period is set to a two-frame period (four-field period) of an image signal. Moreover, delay time is set to a two-field period by a frame delay memory. Specifically, in the case of a frame-delayed signal and a signal having no frame delay, a first field corresponds to a third field. Hadamard transformation is applied to blocks to which the both fields correspond and the above addition and subtraction are performed. Similarly, a second field corresponds to a fourth field. Hadamard transformation is applied to blocks to which the both fields correspond and the above addition and subtraction are performed. Moreover, in the next encoding unit period, a fifth field corresponds to a seventh field and a sixth field corresponds to an eighth field.

A number-of-generated-codes accumulating and calculating portion 14 accumulates the number of codes output from the encoder 13 by a predetermined period and outputs it. The accumulated value (hereafter referred to as actual value) of actual number of generated codes at constant time intervals in the encoding unit period output from the encoder 13 is calculated. That is, the number of codes output from the encoder 13 is accumulated for the encoding unit period and the value is output as an actual value for every constant time interval.

A reference value generating portion 15 outputs a reference number of generated codes (hereafter referred to as reference value) preset synchronously with a time interval in which an actual value is output. For example, the reference value generating portion 15 is constituted of, for example, a memory and sequentially outputs holding data (R1, R2, R3, . . . , Rn) by inputting a counted value (time) from a not-illustrated counter as an address.

A comparator 16 receives an actual value from the number-of-generated-codes accumulating and calculating portion 14 and a reference value from the reference value generating portion 15, compares the actual value with the reference value, and outputs the results of the comparison. Specifically, when the actual value is smaller than the reference value, the comparator 16 outputs Low (0) to the switch 12 and High (1) to the switch 12 when the actual value is larger than the reference value.

When receiving Low (0), the switch 12 directly encodes an input image signal and supplies it to the encoder 13 but when receiving High (1), the switch 12 supplies an input image signal passing through the low-pass filter 10 to the encoder 13.

Figure 2:
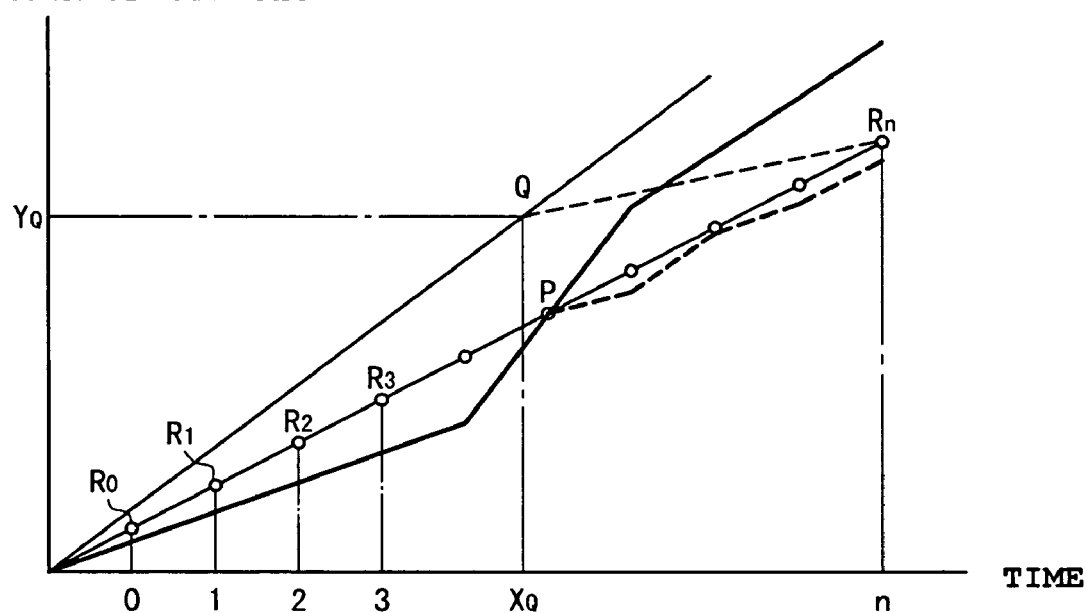
FIG. 2 illustrates an example relationship between the accumulated value of actual number of generated codes at constant time intervals and the accumulated value of a reference number of generated codes preset corresponding to the time intervals.

FIG. 2 is an illustration showing elapsed time versus accumulated generated codes. R1, R2, R3, . . . , Rn in FIG. 2 show reference values output from the reference value generating portion 15 for every certain time. In the example of this embodiment, the reference value is value on a straight line shown by a linear expression to time. However, it is also possible to set the reference value as a value on a curve. In this case, when an encoding unit period is a period from time 0 to time n, a reference value supplied to the comparator 16 becomes R0 at the time 0, R1 at the time 1, and Rn at the time n.

Moreover, a thick line in FIG. 2 shows the accumulated value (actual value) of number of generated codes when number-of-codes control is not performed. The comparator 16 outputs Low (0) while the actual value is smaller than the reference value. Therefore, the switch 12 directly supplies an input image signal to the encoder 13. At the position shown by the point P in FIG. 2, it is assumed that the actual value exceeds the reference value. In this case, an output of the comparator 16 is set to High (1) and an input image signal passing through the low-pass filter 10 and sampling rate decreasing portion 11 is input to the encoder 13 by the switch 12. Because the input image signal passing through the low-pass filter 10 and sampling rate decreasing portion 11 is a signal from which a frequency band and sampling rate are removed, the number of generated codes in the encoder 13 thereafter is decreased to show the change shown by the thick dotted line in FIG. 2.

When considering a case in which the frequency band of an input image signal is restricted to one half, and the sampling rate of the signal is decreased to one half by the low-pass filter 10, the number of codes generated in the encoder 13 is halved. In this case, when the number of codes generated is not adjusted and it is assumed that an actual value (accumulated number of codes) on the extension line of a straight line connecting the point Q with the original in FIG. 2 is increased. When adjustment of the number of codes generated is staffed at time $X_Q$, the number of codes is halved due to the decrease of the frequency band and decrease of the sampling rate. In other words, the increase rate of the actual value (accumulated number of codes) is halved. A condition for an actual value to which encoding control is applied not to exceed Rn in an encoding period (from time 0 to time n) can be expressed as follows. When the coordinates of the point Q are ($X_Q$, $Y_Q$), the following expression (1) can be obtained.

$$(Y_Q/2X_Q) \times n + (Y_Q/2) < Rn \tag{1}$$

$Y_Q$ is obtained by the following expression (2).

$$Y_Q < 2 \times X_Q \times Rn/(n+X_Q) \tag{2}$$

In this case, $X_Q$=0, 1, 2, . . . , n.

That is, by obtaining reference values of R0 to Rn in accordance with the value $Y_Q$ shown by the expression (2), the accumulated number of codes does not exceed Rn. Moreover, the condition is an assumption that the subsequent number of codes increases at the same gradient at the point Q. The same condition can be obtained even when the number of codes increases at two times gradient. The conditional expression in such a case becomes $$(Y_Q/X_Q) \times n + (Y_Q/2) < Rn.$$

The data rate of an output of the encoder 13 in the above encoding control can be shown by Rn/n (bps). The transmission band of a transmission route is set in accordance with the data rate to transmit an encoding signal to the transmission route. Or, when a transmission band is specified, other reference value is set by setting the reference value Rn in accordance with the transmission band.

While an input image signal from the low-pass filter 10 is selected, the resolution of the image signal may be halved. For example, when the encoding unit period of the encoder 13 is equal to a two-frame period of an image signal, periods in which input image signals passing through the low-pass filter 10 are selected are stochastically concentrated in the latter half of an encoding period. Therefore, there is an advantage that the periods are not recognized as image quality deterioration. As an extreme example, in a two-frame (four-field) period, when the period in which an input image signal passing through the low-pass filter 10 is selected is the final fourth field, three images at a high resolution are displayed, and thereafter only one image at a low resolution is presented. Therefore, there is little recognizable deterioration in image quality.

In the case of the above example, the switch 12 is operated based on comparison between the accumulated value and reference value of the actual number of generated codes. However, it is also possible to operate the switch 12 when a change of the number of codes (increase gradient) is detected or when the detected change exceeds a predetermined value.

What is claimed is:

1. An encoding control circuit which controls the number of codes generated in an image encoding circuit, comprising:
   a reference number generator configured to output a preset reference number of codes according to elapsed time from reset of an accumulated value of an actual number of codes in the image encoding circuit;
   a comparison-determination circuit which compares the accumulated value from the reset with the reference number;
   a switch which selects any of a first image signal not deteriorating a frequency bandwidth and a second image signal deteriorating the frequency bandwidth and inputting it to the image encoding circuit; and
   a switch control portion which causes the switch to select the first image signal when the accumulated value does not exceed the reference number, and causing the switch to select the second image signal when the accumulated value exceeds the reference number,
   wherein the second image signal is an image signal whose frequency bandwidth is reduced by a low-pass filter and whose sampling frequency is also reduced.

2. An encoding circuit which encodes and outputting an image signal, comprising:
   an information-quantity decreasing portion which generates a second image signal by decreasing the information quantity of a first image signal and outputting the second image signal,
   wherein the information-quantity decreasing portion restricts the frequency bandwidth of the first image signal as the second image signal, and
   the information-quantity decreasing portion reduces the sampling frequency of the first image signal as the second image signal;
   a selecting portion which selects any of the first image signal and the second image signal in accordance with a selection signal;
   an encoder which encodes the image signal output from the selecting portion;
   a number-of-generated-codes accumulating and calculating portion for accumulating the number of codes of encoded image signals output from the encoder from reset and outputting an accumulated value as an actual value;
   a reference number generator configured to output a reference number predetermined according to elapsed time from reset; and
   a comparator for comparing the accumulated value with the reference value and outputting the selection signal.

* * * * *